(12) United States Patent
Takano et al.

(10) Patent No.: US 11,444,316 B2
(45) Date of Patent: Sep. 13, 2022

(54) SOLID ELECTROLYTE AND ALL-SOLID BATTERY

(71) Applicant: Murata Manufacturing Co., Ltd., Nagaokakyo (JP)

(72) Inventors: Ryohei Takano, Nagaokakyo (JP); Makoto Yoshioka, Nagaokakyo (JP); Takeo Ishikura, Nagaokakyo (JP); Akisuke Ito, Nagaokakyo (JP)

(73) Assignee: MURATA MANUFACTURING CO, LTD., Nagaokakyo (JP)

( * ) Notice: Subject to any disclaimer, the term of this patent is extended or adjusted under 35 U.S.C. 154(b) by 187 days.

(21) Appl. No.: 16/007,008

(22) Filed: Jun. 13, 2018

(65) Prior Publication Data
US 2018/0294520 A1 Oct. 11, 2018

Related U.S. Application Data

(63) Continuation of application No. PCT/JP2017/004130, filed on Feb. 3, 2017.

(30) Foreign Application Priority Data

Feb. 5, 2016 (JP) ................................ 2016-021323

(51) Int. Cl.
*H01M 10/0562* (2010.01)
*H01M 10/0585* (2010.01)
(Continued)

(52) U.S. Cl.
CPC ......... *H01M 10/0562* (2013.01); *C04B 35/01* (2013.01); *C04B 35/6264* (2013.01);
(Continued)

(58) Field of Classification Search
CPC ........ H01M 10/0562; H01M 10/0525; H01M 10/052; H01M 10/0585; H01M 2300/0065–0077; H01M 4/0471; C04B 35/01; C04B 35/62615; C04B 35/62635; C04B 35/6264; C04B 35/62645;
(Continued)

(56) References Cited

U.S. PATENT DOCUMENTS 8,883,357 B2 11/2014 Yoshida et al.
9,350,047 B2 5/2016 Yoshida et al.
(Continued)

FOREIGN PATENT DOCUMENTS

JP 2011051800 A 3/2011
JP 2011147875 A * 8/2011
(Continued)

OTHER PUBLICATIONS

Rettenwander et al., "Site Occupation of Ga and Al in Stabilized Cubic . . . " Chemistry of Materials, vol. 27, No. 8, ACS Publications, 2015, pp. 3135-3142. (Year: 2015).*
(Continued)

*Primary Examiner* — William E McClain
*Assistant Examiner* — Kirsten B Tysl
(74) *Attorney, Agent, or Firm* — ArentFox Schiff LLP

(57) ABSTRACT

A solid electrolyte having a garnet type crystal structure. The garnet type crystal structure contains Li, La, Zr, O and Ga and at least one element selected from Al, Mg, Zn and Sc.

18 Claims, 1 Drawing Sheet

(51) Int. Cl.
*C04B 35/626* (2006.01)
*C04B 35/01* (2006.01)
*H01M 4/04* (2006.01)
*C04B 35/634* (2006.01)
*H01M 10/052* (2010.01)
*H01M 10/0525* (2010.01)

(52) U.S. Cl.
CPC .. *C04B 35/62615* (2013.01); *C04B 35/62635* (2013.01); *C04B 35/62645* (2013.01); *C04B 35/62685* (2013.01); *C04B 35/63408* (2013.01); *H01M 4/0471* (2013.01); *H01M 10/052* (2013.01); *H01M 10/0525* (2013.01); *H01M 10/0585* (2013.01); *C04B 2235/3203* (2013.01); *C04B 2235/3206* (2013.01); *C04B 2235/3217* (2013.01); *C04B 2235/3224* (2013.01); *C04B 2235/3227* (2013.01); *C04B 2235/3244* (2013.01); *C04B 2235/3284* (2013.01); *C04B 2235/3286* (2013.01); *C04B 2235/604* (2013.01); *C04B 2235/764* (2013.01); *C04B 2235/77* (2013.01); *H01M 2300/0071* (2013.01); *H01M 2300/0077* (2013.01)

(58) Field of Classification Search
CPC ........ C04B 35/62685; C04B 35/63408; C04B 2235/3203; C04B 2235/3206; C04B 2235/3217; C04B 2235/3224; C04B 2235/3227; C04B 2235/3244; C04B 2235/3284; C04B 2235/3286; C04B 2235/604; C04B 2235/764; C04B 2235/77
See application file for complete search history.

(56) References Cited

U.S. PATENT DOCUMENTS

| | | | |
|---|---|---|---|
| 2010/0047696 A1 | 2/2010 | Yoshida et al. | |
| 2012/0115039 A1 | 5/2012 | Ouchi et al. | |
| 2013/0344416 A1* | 12/2013 | Sakamoto | C04B 35/6268 |
| | | | 429/495 |
| 2014/0193717 A1* | 7/2014 | Harada | B32B 18/00 |
| | | | 429/304 |
| 2014/0377665 A1 | 12/2014 | Yoshida et al. | |
| 2015/0180001 A1* | 6/2015 | Johnson | H01M 10/0562 |
| | | | 429/144 |
| 2016/0293988 A1* | 10/2016 | Sakamoto | H01M 8/1253 |
| 2016/0308244 A1 | 10/2016 | Badding et al. | |

FOREIGN PATENT DOCUMENTS

| | | | | |
|---|---|---|---|---|
| JP | 2012238545 A | 12/2012 | | |
| WO | WO-2013128759 A1 * | 9/2013 | ............... | H01B 1/08 |

OTHER PUBLICATIONS

WO2013128759 Yamamoto Machine Translation (Year: 2013).*
JP2011147875A Asaoka machine translation (from JPLATPAT) (Year: 2011).*
International Search Report issued for PCT/JP2017/004130, dated May 16, 2017.
Written Opinion of the International Searching Authority issued for PCT/JP2017/004130, dated May 16, 2017.
Rettenwander, D., et al.; "Site Occupation of Ga and Al in Stabilized Cubic $Li_{7-3(x+y)}Ga_xAl_yLa_3Zr_2O_{12}$ Garnets as Deduced from $^{27}Al$ and $^{f}Ga$ MAS NMR at Ultrahigh Magnetic Fields"; Chemistry of Materials, vol. 27, No. 8, ACS Publications, 2015, pp. 3135-3142.

* cited by examiner

SOLID ELECTROLYTE AND ALL-SOLID BATTERY

CROSS REFERENCE TO RELATED APPLICATIONS

The present application is a continuation of International application No. PCT/JP2017/004130, filed Feb. 3, 2017, which claims priority to Japanese Patent Application No. 2016-021323, filed Feb. 5, 2016, the entire contents of each of which are incorporated herein by reference.

FIELD OF THE INVENTION

The present invention relates to a solid electrolyte and an all-solid battery.

BACKGROUND OF THE INVENTION

Heretofore, an all-solid battery has been known as a secondary battery excellent in reliability and safety. For example, Patent Document 1 discloses a ceramic material containing lithium (Li), lanthanum (La), zirconium (Zr), oxygen (O) and aluminum (Al), and having a garnet type crystal structure as a ceramic material exhibiting denseness and Li conductivity with a level of being usable as a solid electrolyte material or the like.

Patent Document 1: Japanese Patent Application Laid-Open No. 2011-51800

SUMMARY OF THE INVENTION

There is a demand for an all-solid battery to improve the ionic conductivity of a solid electrolyte and to improve the battery characteristics of the all-solid battery.

A main object of the present invention is to improve the ionic conductivity of a solid electrolyte and to improve the battery characteristics of an all-solid battery.

As a result of intensive research, the present inventors have found that by adding at least one element selected from the group consisting of Al, Mg, Zn and Sc to a solid electrolyte that contains Li, La, Zr, O and Ga, and has a garnet type crystal structure, the ionic conductivity of the solid electrolyte can be improved, and this finding has now led to the completion of the present invention.

That is, a solid electrolyte according to the present invention is a solid electrolyte having a garnet type crystal structure that contains Li, La, Zr, O and Ga and at least one element selected from the group consisting of Al, Mg, Zn and Sc.

The solid electrolyte according to the present invention has high ionic conductivity.

In the solid electrolyte according to the present invention, a content of Ga is preferably more than 0 mol % and less than 13.4 mol % with respect to a content of La. A total of a content of the at least one element selected from the group consisting of Al, Mg, Zn and Sc is preferably more than 0 mol % and less than 13.4 mol % with respect to the content of La. It is preferred that a total of the content of Ga and the content of the at least one element selected from the group consisting of Al, Mg, Zn and Sc is more than 0.30 mol % and less than 20 mol %.

In the solid electrolyte according to the present invention, the content of Ga is preferably more than 0.66 mol % and less than 6.67 mol % with respect to the content of La. It is preferred that the total of the content of the at least one element selected from the group consisting of Al, Mg, Zn and Sc is more than 0 mol % and less than 6.67 mol % with respect to the content of La. It is preferred that the total of the content of Ga and the content of the at least one element selected from the group consisting of Al, Mg, Zn and Sc is more than 0.33 mol % and less than 10 mol %.

In the solid electrolyte according to the present invention, a content of Zr is preferably 50 mol % or more and 80 mol % or less with respect to the content of La. A content of Li is preferably 197 mol % or more and 280 mol % or less with respect to the content of La.

The garnet type crystal structure is preferably represented by general formula $(Li_{7-(3x+ay)}Ga_xM_y)La_3Zr_2O_{12}$ (M is at least one element selected from the group consisting of Al, Mg, Zn and Sc, a is a valence of M, and $0<x<0.3$, $0<y<0.3$, $0.4<3x+ay<0.9$).

The garnet type crystal structure is more preferably represented by general formula $(Li_{7-(3x+3y)}Ga_xM_y)La_3Zr_2O_{12}$ (M is Al, $0<x<0.3$, $0<y<0.3$, $0.1<x/y<1$, $0.6<3x+3y<0.9$).

An all-solid battery according to the present invention includes a solid electrolyte layer containing the solid electrolyte according to the present invention, a positive electrode joined to one surface of the solid electrolyte layer by sintering, and a negative electrode joined to another surface of the solid electrolyte layer by sintering.

As described above, the solid electrolyte according to the present invention has high ionic conductivity. Therefore, the solid electrolyte layer containing the solid electrolyte also has high ionic conductivity. Accordingly, the all-solid battery according to the present invention is excellent in battery characteristics such as power density.

The present invention can improve the ionic conductivity of a solid electrolyte and improve the battery characteristics of an all-solid battery.

DETAILED DESCRIPTION OF THE INVENTION

Figure 1:
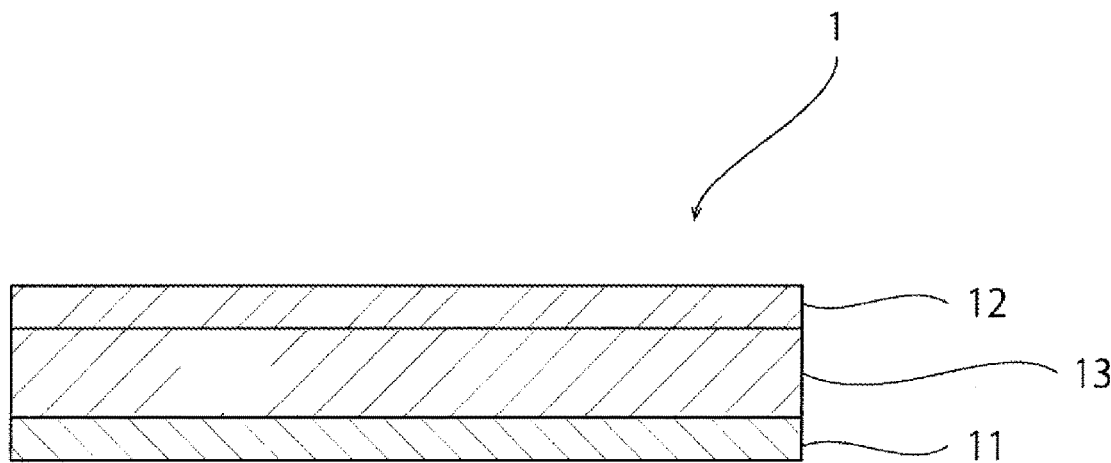
FIG. 1 is a schematic cross-sectional view of an all-solid battery according to an embodiment of the present invention.

Hereinafter, examples of preferred embodiments of the present invention will be described. However, the following embodiments are merely examples, and the present invention is not limited to the following embodiments, but only by the claims.

Further, in drawings referred to in the various embodiments, substantially identical functional elements are denoted by the same reference numbers. Further, the drawings referred to in the embodiments are schematically shown. The dimensional ratios and the like of objects pictured in the drawings may be different from those of real objects. The dimensional ratios and the like of an object may also differ between drawings. Rather than relying on the drawings, the dimensional ratios and the like of specific objects should be determined in consideration of the following description.

FIG. 1 is a schematic cross-sectional view of an all-solid battery 1 according to the present embodiment. As shown in FIG. 1, the all-solid battery 1 includes a negative electrode 12, a positive electrode 11, and a solid electrolyte layer 13.

The positive electrode 11 contains positive electrode active material particles. Examples of the positive electrode active material particles preferably used include lithium-containing phosphate compound particles having a nasicon type structure, lithium-containing phosphate compound particles having an olivine type structure, lithium-containing layered oxide particles, lithium-containing oxide particles having a spinel type structure and the like. Specific examples of the lithium-containing phosphate compound having a nasicon type structure and being preferably used include $Li_3V_2(PO_4)_3$, and the like. Specific examples of the lithium-containing phosphate compound having an olivine type structure and being preferably used include $Li_3Fe_2(PO_4)_3$, $LiMnPO_4$, and the like. Specific examples of the lithium-containing layered oxide particles preferably used include $LiCoO_2$, $LiCo_{1/3}Ni_{1/3}Mn_{1/3}O_2$, and the like. Specific examples of the lithium-containing oxide having a spinel type structure and being preferably used include $LiMn_2O_4$, $LiNi_{0.5}Mn_{1.5}O_4$, $Li_4Ti_5O_{12}$, and the like. Only one kind of these positive electrode active material particles may be used, or a plurality of types of these positive electrode active material particles may be mixed and used.

The positive electrode 11 may further contain a solid electrolyte. The type of the solid electrolyte contained in the positive electrode 11 is not particularly limited; however, it is preferred to contain the same type of solid electrolyte as the solid electrolyte contained in the solid electrolyte layer 13.

The negative electrode 12 contains negative electrode active material particles. Specific examples of the negative electrode active material particles preferably used include compound particles represented by $MO_X$ (M is at least one selected from the group consisting of Ti, Si, Sn, Cr, Fe, Nb and Mo, and $0.9 \leq X \leq 2.0$), graphite-lithium compound particles, lithium metal, lithium alloy particles, lithium-containing phosphate compound particles having a nasicon type structure, lithium-containing phosphate compound particles having an olivine type structure, lithium-containing oxide particles having a spinel type structure, and the like. Specific examples of the lithium alloy preferably used include Li—Al alloys and the like. Specific examples of the lithium-containing phosphate compound having a nasicon type structure and being preferably used include $Li_3V_2(PO_4)_3$, and the like. Specific examples of the lithium-containing phosphate compound having an olivine type structure and being preferably used include $Li_3Fe_2(PO_4)_3$, and the like. Specific examples of the lithium-containing oxide having a spinel type structure and being preferably used include $Li_4Ti_5O_{12}$, and the like Only one kind of these negative electrode active material particles may be used, or a plurality of types of these negative electrode active material particles may be mixed and used.

The negative electrode 12 may further contain a solid electrolyte. The type of the solid electrolyte contained in the negative electrode 12 is not particularly limited; however, it is preferred to contain the same type of solid electrolyte as the solid electrolyte contained in the solid electrolyte layer 13.

The solid electrolyte layer 13 is disposed between the positive electrode 11 and the negative electrode 12. That is, the positive electrode 11 is disposed on one side of the solid electrolyte layer 13, and the negative electrode 12 is disposed on the other side. Each of the positive electrode 11 and the negative electrode 12 is joined to the solid electrolyte layer 13 by sintering. That is, the positive electrode 11, the solid electrolyte layer 13 and the negative electrode 12 are an integrally sintered body.

The solid electrolyte contained in the solid electrolyte layer 13 has a garnet type crystal structure. In the present invention, the garnet type crystal structure includes not only a crystal structure represented by $A_3B_2C_3O_{12}$ but also a crystal structure including Li at a C site and also Li at an interstitial site, that is, a crystal structure represented by $A_3B_2(C_{3-x}Li_x)Li_yO_{12}$ in which $0 \leq x \leq 3$ and $0 \leq y \leq 6$.

The solid electrolyte layer 13 has a garnet type crystal structure and contains Li, La, Zr, O and Ga and at least one element selected from the group consisting of Al, Mg, Zn and Sc. Therefore, the solid electrolyte layer 13 has high ionic conductivity. Accordingly, the all-solid battery 1 having the solid electrolyte layer 13 is excellent in battery characteristics such as power density. Although the reason for this is not clear, it is considered that at least one selected from the group consisting of Al, Mg, Zn and Sc is located at the Li site, Zr site or La site, thereby attaining high ionic conductivity. When at least one selected from the group consisting of Al, Mg, Zn and Sc is predominantly located at the Li site, the effect of improving the ionic conductivity is considered to be the highest; however, it is also considered that the effect of improving the ionic conductivity is obtained when some elements are located at the Zr site or La site. Li, La, Zr, O and Ga, and a part of at least one element selected from the group consisting of Al, Mg, Zn and Sc may be present at the grain boundary as a composite oxide with a Li salt or a constituent element.

A basic crystal structure of the solid electrolyte contained in the solid electrolyte layer 13 is preferably a garnet type represented by $Li_7La_3Zr_2O_{12}$. However, a ratio of Li:La:Zr:O in the oxide does not necessarily have to be 7:3:2:12 that is stoichiometric composition, and respective elements may be partially deficient.

In the solid electrolyte contained in the solid electrolyte layer 13, it is preferred that the total of the content of Ga and the content of at least one element selected from the group consisting of Al, Mg, Zn and Sc is more than 0.30 mol % and less than 20 mol %. When the contents of these elements are set to the above range, a cubic crystal that is a high-ionic conduction phase in the garnet type crystal structure is suitably retained and an ion path of Li is suitably formed, and therefore higher ionic conductivity can be realized. When the contents of these elements are too low, a cubic crystal that is a high-ionic conduction phase in the garnet type crystal structure is not suitably retained, and therefore the ionic conductivity may be low. When the contents of these elements are too high, the existence of Ga in the Li site interferes the Li ion path, and the ionic conductivity may decrease. From the viewpoint of realizing higher ionic conductivity, the total of the content of Ga and the content of at least one element selected from the group consisting of Al, Mg, Zn and Sc is more than 3.33 mol % and less than 10 mol %.

In the solid electrolyte contained in the solid electrolyte layer 13, the content of Ga is preferably more than 0 mol % and less than 13.4 mol % with respect to the content of La. When the content of Ga is set to the above range, it is possible to stabilize the cubic crystal that is a high-ionic conduction phase and to reduce impurity layers formed by reaction of Ga with Li, La, Zr and O that are constituent elements of the garnet type structure, and therefore higher ionic conductivity can be realized. From the viewpoint of realizing higher ionic conductivity, the content of Ga is preferably more than 0.66 mol % and less than 6.67 mol % with respect to the content of La.

In the solid electrolyte contained in the solid electrolyte layer 13, the total of the content of at least one element selected from the group consisting of Al, Mg, Zn and Sc is more than 0.30 mol % and less than 20 mol % with respect to the content of La. When the content of at least one element selected from the group consisting of Al, Mg, Zn and Sc is set to the above range, the cubic crystal that is a high-ionic conduction phase can be stabilized, and impurity layers are formed by reaction of Al, Mg, Zn and Sc with Li, La, Zr, and O that are constituent elements of the garnet type structure, and therefore higher ionic conductivity can be realized. From the viewpoint of realizing higher ionic conductivity, the content of at least one element selected from the group consisting of Al, Mg, Zn and Sc is preferably more than 0 mol % and less than 6.67 with respect to the content of La.

In the solid electrolyte contained in the solid electrolyte layer 13, the content of Zr is preferably 50 mol % to 80 mol % with respect to the content of La. When the content of Zr is set to the above range, the solid electrolyte easily takes the garnet type structure, and the content of Zr is more preferably 60 mol % to 70 mol % with respect to the content of La from the viewpoint of realizing higher ionic conductivity.

In the solid electrolyte contained in the solid electrolyte layer 13, the content of Li is preferably 197 mol % or more and 280 mol % or less with respect to the content of La. Further, when the solid electrolyte has $Li_xLa_3Zr_2O_{12}$, it is preferred that x satisfies the relationship of $5.9 \leq x \leq 8.4$. When the content of Li is set to the above range, the solid electrolyte easily takes the garnet type structure, and the content of Li is more preferably 203 mol % or more and 220 mol % or less with respect to the content of La from the viewpoint of realizing higher ionic conductivity.

From the viewpoint of realizing even higher conductivity, the solid electrolyte contained in the solid electrolyte layer 13 is preferably a solid electrolyte represented by the general formula $(Li_{7-(3x+ay)}Ga_xM_y)La_3Zr_2O_{12}$ (M is at least one element selected from the group consisting of Al, Mg, Zn and Sc, a is a valence of M, and $0<x<0.3$, $0<y<0.3$, $0.4<3x+ay<0.9$), and more preferably a solid electrolyte represented by the general formula $(Li_{7-(3x+3y)}Ga_xM_y)La_3Zr_2O_{12}$ (M is Al, $0<x<0.3$, $0<y<0.3$, $0.1<x/y<1$, $0.6<3x+3y<0.9$).

The reason why the Ga/Al ratio affects the ionic conductivity is not necessarily clear, but it is considered as follows. There are two sites on the garnet-type Li site, that is, Li 1 site and Li 2 site. It is considered that Ga and Al added this time occupy the Li site, but the occupancies of Ga and Al to these two sites are presumed to be different between Ga and Al. When the addition ratio of Ga and Al changes, the balance between occupation of the two Li sites changes, which is considered to change the conductivity by causing a difference in Li conduction path and Li site occupancy. When x/y and (3x+3y) are set to the above ranges, it is considered that the Li conduction path that is advantageous for Li conduction, and the Li site occupancy are achieved and the conductivity is improved.

The stoichiometric ratio of Li in the solid electrolyte is preferably (7−(3x+ay)), but in the case of the garnet type compound, it is difficult to strictly control the amount of Li because of the influence of Li deficiency at the time of sintering and a trace amount of impurities formed at the grain boundary. As a result of intensive research by the present inventors, it has been found that when the amount of Li contained in the solid electrolyte is within a certain range with respect to the stoichiometric ratio, the ionic conductivity does not decrease greatly. Specifically, it is preferable that the amount of Li is in the range of about ±10 mol %, and more preferably about ±3 mol %, with respect to the stoichiometric ratio of Li of 7−(3x+ay) in the solid electrolyte. Accordingly, in the present invention, the solid electrolyte is preferably a solid electrolyte represented by the general formula $(Li_{7-(3x+ay)}Ga_xM_y)La_3Zr_2O_{12}$ (M is at least one element selected from the group consisting of Al, Mg, Zn and Sc, a is a valence of M, and $0<x<0.3$, $0<y<0.3$, $0.4<3x+ay<0.9$), and the solid electrolyte represented by the general formula $(Li_{7-(3x+3y)}Ga_xM_y)La_3Zr_2O_{12}$ (M is Al, $0<x<0.3$, $0<y<0.3$, $0.1<x/y<1$, $0.6<3x+3y<0.9$) includes a solid electrolyte in which the amount of Li is in the range of about ±10 mol % with respect to the stoichiometric ratio of Li of 7−(3x+ay).

(Method for Manufacturing Solid Electrolyte)

Next, an example of a method for manufacturing the solid electrolyte will be described.

First, a raw material as a Li source, a raw material as a Zr source, a raw material as a La source, and raw materials of Ga and at least one element selected from the group consisting of Al, Mg, Zn, and Sc are weighed in a desired ratio and mixed. The resulting mixed powder is calcined to prepare a calcined body. A solid electrolyte can be obtained by firing the resulting calcined body. First, raw materials of Ga and at least one element selected from the group consisting of Al, Mg, Zn and Sc may be added at the stage after preparing a garnet-type crystal phase and before sintering. This makes it possible to accurately control the amount of Ga and at least one element selected from the group consisting of Al, Mg, Zn and Sc to be added.

(Method for Manufacturing All-Solid Battery 1)

Next, an example of a method for manufacturing the all-solid battery 1 will be described.

First, a paste is prepared by appropriately mixing a solvent, a resin, and the like with active material particles and a solid electrolyte. The paste is applied onto a sheet and dried to form a first green sheet for constituting the positive electrode 11. Similarly, a second green sheet for forming the negative electrode 12 is formed.

A paste is prepared by appropriately mixing a solvent, a resin, and the like with a solid electrolyte. The paste is applied and dried to prepare a third green sheet for constituting the solid electrolyte layer 13.

Next, the first to third green sheets are appropriately laminated to prepare a laminate. The prepared laminate may be pressed. Preferred pressing methods include isostatic pressing and the like.

Thereafter, the all-solid battery 1 can be obtained by sintering the laminate.

The present invention will be described in more detail below based on specific examples, but the present invention is not limited to the following examples at all, and variations and modifications may be appropriately made without departing from the gist of the invention.

Comparative Example 1

A Material containing lithium hydroxide monohydrate ($LiOH-H_2O$), aluminum oxide ($Al_2O_3$), lanthanum hydroxide ($La(OH)_3$), and zirconium oxide ($ZrO_2$) was weighed so as to have composition shown in Table 1 described below. Next, water was added, and the resultant was enclosed in a 100 ml polyethylene pot made of polyethylene and rotated on a pot rack at 150 rpm for 16 hours to mix the raw materials. In addition, lithium hydroxide monohydrate $LiOH-H_2O$ as a Li source was charged in excess of 5 mass % with respect to the target composition in consideration of Li deficiency at the time of sintering.

Then, the resulting slurry was dried and then calcined in a mixed gas of nitrogen gas and air at 900° C. for 5 hours.

Next, a mixed solvent of toluene and acetone was added to the resulting calcined product, and the mixture was pulverized with a planetary ball mill for 6 hours to obtain a solid electrolyte.

Next, the solid electrolyte, a butyral resin and alcohol were mixed at a mass ratio of 200:15:140, and then alcohol was removed on a hot plate at 80° C. to obtain a solid electrolyte powder coated with the butyral resin serving as a binder.

Next, the solid electrolyte powder coated with the butyral resin was pressed at 90 MPa using a tablet molding machine, and formed into a tablet shape. The resulting solid electrolyte in a tablet shape was adequately covered with a mother powder, sandwiched between two $ZrO_2$ setters, and fired at a temperature of 500° C. in an oxygen atmosphere to remove the butyral resin. Then, the temperature was raised to about 1100° C. in an oxygen atmosphere, and the mixture was fired at 1100° C. for 3 hours. Thereafter, a sintered body of the solid electrolyte (solid electrolyte layer) was obtained by lowering the temperature. A dense sintered body having a bulk density of about 4.8 g/cm$^3$ to 5.0 g/cm$^3$ could be prepared by preparing a sintered body of the solid electrolyte through the above method.

Example 1

A solid electrolyte layer was prepared in the same manner as in Comparative Example 1 except that a raw material containing lithium hydroxide monohydrate (LiOH—$H_2O$), gallium oxide ($Ga_2O_3$), magnesium oxide (MgO), lanthanum hydroxide (La(OH)$_3$), and zirconium oxide ($ZrO_2$) was weighed so as to have composition shown in Table 1 described below.

Example 2

A solid electrolyte layer was prepared in the same manner as in Comparative Example 1 except that a raw material containing lithium hydroxide monohydrate (LiOH—$H_2O$), gallium oxide ($Ga_2O_3$), aluminum oxide ($Al_2O_3$), lanthanum hydroxide (La(OH)$_3$), and zirconium oxide ($ZrO_2$) was weighed so as to have composition shown in Table 1 described below.

Example 3

A solid electrolyte layer was prepared in the same manner as in Comparative Example 1 except that a raw material containing lithium hydroxide monohydrate (LiOH—$H_2O$), gallium oxide ($Ga_2O_3$), scandium oxide ($Sc_2O_3$), lanthanum hydroxide (La(OH)$_3$), and zirconium oxide ($ZrO_2$) was weighed so as to have composition shown in Table 1 described below.

(Measurement of Ionic Conductivity of Solid Electrolyte Layer)

The ionic conductivity of the solid electrolyte layer prepared in each of comparative example and Examples 1 to 3 was measured in the following manner.

First, a platinum (Pt) layer serving as a current collector layer was formed on both surfaces of a sintered tablet (solid electrolyte layer) by sputtering, and then sandwiched by a current collector made of SUS and fixed. Thereafter, an AC impedance was measured at room temperature (25° C.) in the range of 0.1 MHz to 1 MHz (±50 mV) to evaluate ionic conductivity. The results are shown in Table 1.

Figure 2:
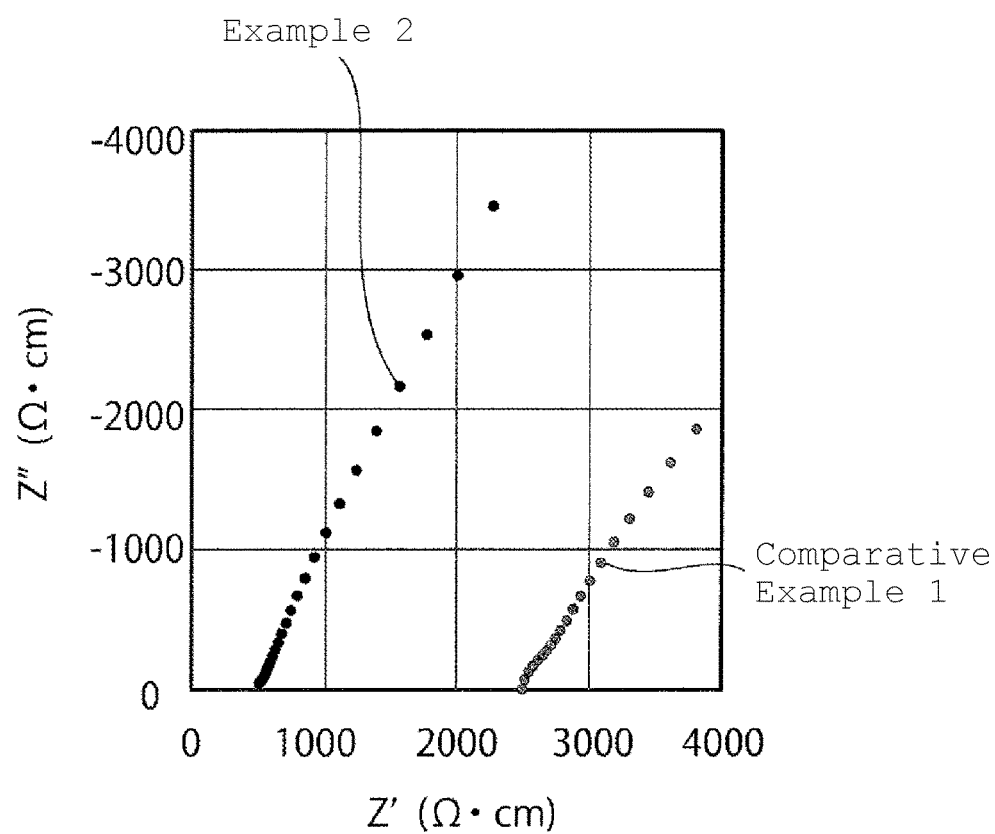
FIG. 2 is a graph showing measurement results of AC impedance of a solid electrolyte prepared in each of Comparative Example 1 and Example 2.

In addition, FIG. 2 shows a graph (Nyquist plot) showing measurement results of the AC impedance of the solid electrolyte prepared in each of Comparative Example 1 and Example 2.

TABLE 1

|  | Composition of Solid Electrolyte | Ionic Conductivity |
|---|---|---|
| Comparative Example 1 | $Li_{6.34}Al_{0.22}La_3Zr_2O_{12}$ | $4.0 \times 10^{-04}$ S/cm |
| Example 1 | $Li_{6.34}Ga_{0.17}Mg_{0.075}La_3Zr_2O_{12}$ | $1.5 \times 10^{-03}$ S/cm |
| Example 2 | $Li_{6.34}Ga_{0.10}Al_{0.12}La_3Zr_2O_{12}$ | $2.1 \times 10^{-03}$ S/cm |
| Example 3 | $Li_{6.34}Ga_{0.17}Sc_{0.05}La_3Zr_2O_{12}$ | $1.7 \times 10^{-03}$ S/cm |

From the results shown in Table 1, it can be seen that ionic conductivity can be increased by containing Ga, Al, Mg or Sc. The same effect can be expected also when Zn having the same valence and the same ionic radius as Mg is contained.

Example 4

A solid electrolyte layer was prepared in the same manner as in Comparative Example 1 except that a raw material containing lithium hydroxide monohydrate (LiOH—$H_2O$), gallium oxide ($Ga_2O_3$), aluminum oxide ($Al_2O_3$), lanthanum hydroxide (La(OH)$_3$), and zirconium oxide ($ZrO_2$) was weighed so as to have composition shown in Table 2 described below, and the ionic conductivity was measured by the above method. The results are shown in Table 2.

Example 5

A solid electrolyte layer was prepared in the same manner as in Comparative Example 1 except that a raw material containing lithium hydroxide monohydrate (LiOH—$H_2O$), gallium oxide ($Ga_2O_3$), aluminum oxide ($Al_2O_3$), lanthanum hydroxide (La(OH)$_3$), and zirconium oxide ($ZrO_2$) was weighed so as to have composition shown in Table 2 described below, and the ionic conductivity was measured by the above method. The results are shown in Table 2.

Example 6

A solid electrolyte layer was prepared in the same manner as in Comparative Example 1 except that a raw material containing lithium hydroxide monohydrate (LiOH—$H_2O$), gallium oxide ($Ga_2O_3$), aluminum oxide ($Al_2O_3$), lanthanum hydroxide (La(OH)$_3$), and zirconium oxide ($ZrO_2$) was weighed so as to have composition shown in Table 2 described below, and the ionic conductivity was measured by the above method. The results are shown in Table 2.

TABLE 2

|  | Composition | Al/La (%) | Ga/La (%) | Ionic Conductivity (25° C.) |
|---|---|---|---|---|
| Comparative Example 1 | $Li_{6.34}Al_{0.22}La_3Zr_2O_{12}$ | 7.33 | 0 | $3.0 \times 10^{-04}$ S/cm |
| Example 4 | $Li_{6.34}Ga_{0.19}Al_{0.02}La_3Zr_2O_{12}$ | 0.667 | 6.33 | $1.7 \times 10^{-03}$ S/cm |
| Example 2 | $Li_{6.34}Ga_{0.10}Al_{0.12}La_3Zr_2O_{12}$ | 4.00 | 3.33 | $2.1 \times 10^{-03}$ S/cm |

TABLE 2-continued

| | Composition | Al/La (%) | Ga/La (%) | Ionic Conductivity (25° C.) |
|---|---|---|---|---|
| Example 5 | $Li_{6.34}Ga_{0.05}Al_{0.17}La_3Zr_2O_{12}$ | 5.67 | 1.67 | $2.5 \times 10^{-03}$ S/cm |
| Example 6 | $Li_{6.34}Ga_{0.02}Al_{0.20}La_3Zr_2O_{12}$ | 6.67 | 0.667 | $8.3 \times 10^{-04}$ S/cm |

From the results shown in Table 2, it is found that the change in the ionic conductivity is obtained when the content of Ga and the content of Al are changed, with the total of the contents of Ga and Al being constant. From the results shown in Table 2, it is found that the ionic conductivity can be greatly improved by increasing the content of Al to more than 0.66 mol % with respect to the content of La. Further, it is found that the conductivity decreases as the amount of Ga becomes less than 0.67 mol % with respect to the content of La. Therefore, the content of Ga is preferably more than 0.66 mol %. In the region where the content ratio of Ga to Al is more than 0.1 and less than 1, the conductivity is almost maximized, which is more preferable.

Example 7

A solid electrolyte layer was prepared in the same manner as in Comparative Example 1 except that a raw material containing lithium hydroxide monohydrate (LiOH—H$_2$O), gallium oxide (Ga$_2$O$_3$), aluminum oxide (Al$_2$O$_3$), lanthanum hydroxide (La(OH)$_3$), and zirconium oxide (ZrO$_2$) was weighed so as to have composition shown in Table 3 described below, and the ionic conductivity was measured by the above method. The results are shown in Table 3.

Example 8

A solid electrolyte layer was prepared in the same manner as in Comparative Example 1 except that a raw material containing lithium hydroxide monohydrate (LiOH—H$_2$O), gallium oxide (Ga$_2$O$_3$), aluminum oxide (Al$_2$O$_3$), lanthanum hydroxide (La(OH)$_3$), and zirconium oxide (ZrO$_2$) was weighed so as to have composition shown in Table 3 described below, and the ionic conductivity was measured by the above method. The results are shown in Table 3.

Example 9

A solid electrolyte layer was prepared in the same manner as in Comparative Example 1 except that a raw material containing lithium hydroxide monohydrate (LiOH—H$_2$O), gallium oxide (Ga$_2$O$_3$), aluminum oxide (Al$_2$O$_3$), lanthanum hydroxide (La(OH)$_3$), and zirconium oxide (ZrO$_2$) was weighed so as to have composition shown in Table 3 described below, and the ionic conductivity was measured by the above method. The results are shown in Table 3.

Example 10

A solid electrolyte layer was prepared in the same manner as in Comparative Example 1 except that a raw material containing lithium hydroxide monohydrate (LiOH—H$_2$O), gallium oxide (Ga$_2$O$_3$), aluminum oxide (Al$_2$O$_3$), lanthanum hydroxide (La(OH)$_3$), and zirconium oxide (ZrO$_2$) was weighed so as to have composition shown in Table 3 described below, and the ionic conductivity was measured by the above method. The results are shown in Table 3.

TABLE 3

| | Composition of Solid Electrolyte | Ionic Conductivity (25° C.) |
|---|---|---|
| Example 7 | $Li_{6.62}Ga_{0.03}Al_{0.01}La_3Zr_2O_{12}$ | $2.0 \times 10^{-04}$ S/cm |
| Example 8 | $Li_{6.62}Ga_{0.04}Al_{0.12}La_3Zr_2O_{12}$ | $1.0 \times 10^{-03}$ S/cm |
| Example 5 | $Li_{6.34}Ga_{0.05}Al_{0.17}La_3Zr_2O_{12}$ | $2.5 \times 10^{-03}$ S/cm |
| Example 9 | $Li_{6.28}Ga_{0.06}Al_{0.18}La_3Zr_2O_{12}$ | $2.0 \times 10^{-03}$ S/cm |
| Example 10 | $Li_{6.10}Ga_{0.07}Al_{0.23}La_3Zr_2O_{12}$ | $6.5 \times 10^{-04}$ S/cm |

From the results shown in Table 3, it is found that the change in the ionic conductivity is obtained when the total of the contents of Ga and Al is changed, with Ga:Al being approximately 1:3. From the results shown in Table 3, it is found that high ionic conductivity can be attained when the content of Li is more than 6.1 and less than 6.6 (that is, $0.4 < 3x+ay < 0.9$). It is found that higher ionic conductivity can be attained when $3x+ay$ satisfies $0.6 < 3x+ay < 0.9$.

DESCRIPTION OF REFERENCE SYMBOLS

1: All-solid battery
11: Positive electrode
12: Negative electrode
13: Solid electrolyte layer

The invention claimed is:

1. A solid electrolyte comprising a garnet type crystal structure represented by $(Li_{7-(3x+3y)}Ga_xSc_y)La_3Zr_2O_{12}$ where α is a valence of Sc, and $0 < x < 0.3$, $0 < y < 0.3$, $0.4 < 3x+ay < 0.9$.

2. The solid electrolyte according to claim 1, wherein
a first content of Ga is more than 0 mol % and less than 13.4 mol % with respect to a second content of La,
a total of a third content of the Sc is more than 0 mol % and less than 13.4 mol % with respect to the second content of La, and
a total of the first content of Ga and the third content of the Sc is more than 0.30 mol % and less than 20 mol % in the garnet type crystal structure.

3. The solid electrolyte according to claim 2, wherein
the first content of Ga is more than 0.66 mol % and less than 6.67 mol % with respect to the second content of La,
the total of the third content of the Sc is more than 0 mol % and less than 6.67 mol % with respect to the second content of La, and
the total of the first content of Ga and the third content of the Sc is more than 0.33 mol % and less than 10 mol % in the garnet type crystal structure.

4. The solid electrolyte according to claim 3, wherein
a fourth content of Zr is 50 mol % to 80 mol % with respect to the second content of La, and
a fifth content of Li is 197 mol % to 280 mol % with respect to the second content of La.

5. The solid electrolyte according to claim 4, wherein
the fourth content of Zr is 60 mol % to 70 mol % with respect to the second content of La, and
the fifth content of Li is 203 mol % to 220 mol % with respect to the second content of La.

6. The solid electrolyte according to claim 1, wherein a first content of Ga is more than 0 mol % and less than 13.4 mol % with respect to a second content of La.

7. The solid electrolyte according to claim 6, wherein the first content of Ga is more than 0.66 mol % and less than 6.67 mol % with respect to the second content of La.

8. The solid electrolyte according to claim 1, wherein a total of a first content of the Sc is more than 0 mol % and less than 13.4 mol % with respect to a second content of La.

9. The solid electrolyte according to claim 8, wherein the total of the first content of the Sc is more than 0 mol % and less than 6.67 mol % with respect to the second content of La.

10. The solid electrolyte according to claim 1, wherein a total of a first content of Ga and a second content of the Sc is more than 0.30 mol % and less than 20 mol % in the garnet type crystal structure.

11. The solid electrolyte according to claim 10, wherein the total of the first content of Ga and the second content of the Sc is more than 0.33 mol % and less than 10 mol % in the garnet type crystal structure.

12. The solid electrolyte according to claim 1, wherein a first content of Zr is 50 mol % to 80 mol % with respect to a second content of La.

13. The solid electrolyte according to claim 12, wherein the first content of Zr is 60 mol % to 70 mol % with respect to the second content of La.

14. The solid electrolyte according to claim 1, wherein a first content of Li is 197 mol % to 280 mol % with respect to a second content of La.

15. The solid electrolyte according to claim 14, wherein the first content of Li is 203 mol % to 220 mol % with respect to the second content of La.

16. An all-solid battery comprising:
a solid electrolyte layer containing the solid electrolyte according to claim 1;
a positive electrode joined to a first surface of the solid electrolyte layer; and
a negative electrode joined to a second surface of the solid electrolyte layer.

17. The all-solid battery according to claim 16, wherein
a first content of Ga is more than 0 mol % and less than 13.4 mol % with respect to a second content of La,
a total of a third content of the Sc is more than 0 mol % and less than 13.4 mol % with respect to the second content of La, and
a total of the first content of Ga and the third content of the Sc is more than 0.30 mol % and less than 20 mol % in the garnet type crystal structure.

18. The all-solid battery according to claim 17, wherein
the first content of Ga is more than 0.66 mol % and less than 6.67 mol % with respect to the second content of La,
the total of the third content of the Sc is more than 0 mol % and less than 6.67 mol % with respect to the second content of La, and
the total of the first content of Ga and the third content of the Sc is more than 0.33 mol % and less than 10 mol % in the garnet type crystal structure.

* * * * *